United States Patent Office 2,747,028
Patented May 22, 1956

2,747,028

AMPLIFIER CIRCUIT

Calvin M. Clark, Fullerton, Calif., assignor to California Research Corporation, San Francisco, Calif., a corporation of Delaware Application October 29, 1952, Serial No. 317,469

5 Claims. (Cl. 179—171)

My invention relates to an alternating current amplifier and particularly to an amplifier having a variable gain.

My invention has particular applicability to seismic prospecting. The most generally accepted method of seismic prospecting is known as reflection shooting and consists of the creation of artificial seismic waves by firing a charge of dynamite at the bottom of a hole deep enough to reach through the weathered layer of the earth and contact a more dense layer. Such holes may extend from 10 to 200 or more feet in depth, and the depth is of considerable importance since shots made too near the surface tend to impart too much energy to waves which travel along or near the surface. Surface waves which are generally present to some extent in seismic waves are a disturbing factor in recording operations. Such waves may be of the so-called Rayleigh type, resulting in ground roll.

Seismic waves generated by the explosion travel in all directions through the earth, and those travelling downwardly are reflected from respective interfaces existing between abutting strata and returned to the surface, upon which is distributed a plurality of seismometers situated at varying distances from the shot point. Each of these seismometers is arranged to convert the seismic wave energy into electric waves of corresponding intensity and in synchronism with the seismic waves. The electric waves which are relatively feeble are amplified and conducted each to one element of a recording galvanometer. The Rayleigh wave is followed by a number of vibrations having an amplitude which generally decreases with time. Some of these later vibrations are stronger than others and correspond to the arrival of waves which have been reflected or refracted upwardly from subterranean strata interfaces.

By detecting, amplifying and recording these various earth vibrations, information can be secured as to the existence and location of subterranean geological structures. In modern seismic prospecting practice the earth waves are detected by electrical detectors which produce a fluctuating electrical signal corresponding to the amplitude of the earth tremors or to the velocity or acceleration of such tremors, depending upon the particular type of detector used. The electrical signal is amplified by a vacuum tube amplifier, and the amplified signal is recorded by a galvanometer. The amplitude of the recorded signal is determined by the amplification or gain of the amplifier which can be preliminarily adjusted to a predetermined value.

As stated, the first arrival wave is in general much more violent than any of the later waves. Difficulty arises from the fact that, if the amplification factor of the amplifier is adjusted so that the first arrival is recorded at a desired amplitude, the later arrivals are recorded at inconveniently smaller amplitudes. If, on the other hand, the amplifier is adjusted to receive the later arrivals with readable amplitude, the amplitude of the first arrival is so great that it exceeds the limits of the recording mechanism. Acordingly, there have come into use automatic volume control amplifiers, i. e., amplifiers arranged so that their gain is automatically reduced when the incoming signal is strong, and restored to its normal value when the incoming signal is weak. Such amplifiers usually embody means for taking off a portion of the signal energy either from the input or the output of the amplifier and using this energy to bias a tube in the amplifier. This bias tends to lessen the sensitivity of the amplifier when the signal strength rises unduly, and inherently decreases the sensitivity of the amplifier to low frequency signals. In general, such amplifiers have been wholly satisfactory. In certain applications, however, their unsatisfactory operation at very low frequencies is a severe detriment. For example, it has been found desirable at times to employ reproducible seismic recording wherein it is desired to get an accurate record of all frequencies carried by the signal, a procedure which permits seismic records to be filtered or phase-shifted after recording as opposed to the more common method of filtering the signals as they are recorded. Reproducible seismic recording is most useful when a wide band of seismic frequencies is recorded. In such systems automatic gain control is not satisfactory due to its poor low frequency characteristics.

Gain control systems employing diodes as amplitude limiting elements have been employed for some seismic recording applications, but such circuits are not desirable for wide-band seismic recording because their high frequency response is unsatisfactory. The poor high frequency response is due to the fact that the resistance of the diode is masked by its capacitive effect at high frequencies.

While my invention can be used satisfactorily in combination with automatic gain control circuits, as will be pointed out later, I prefer to use it as a time-varying gain control. By this arrangement the gain of the amplifier is controlled to give relatively uniform signal amplitude by varying the gain of the amplifier with time according to a program which experience has indicated substantially will compensate for the varying signal from the seismometers. Prior art systems employing time-varying gain control have generally applied a varying negative bias voltage to the grid of the first amplifier tube. An amplifier which is to transmit signals in a consistent fashion generally requires a regulated positive high voltage supply. If the gain control is effected by means of a bias voltage applied to the grid of one or more of the amplifier tubes, this bias voltage must be derived from a second voltage supply. If the gain control is to be calibrated, the second voltage supply must also be regulated to provide a constant voltage. The provision of two regulated voltage sources in the amplifier connected with each seismometer adds greatly to the bulk of the apparatus and may require too much space for use in an ordinary seismic survey vehicle.

Other amplifier circuits employ a pentode as the gain control amplifier tube. By virtue of its multiplicity of grids, the pentode tends to be noisier than the triode. It is therefore desirable, in order to minimize the recording of noise signals, that a triode be employed in the seismic amplifier circuit.

Prior art gain control amplifiers of which I am aware are unable to control the amplifier over the entire range of variation of the seismic signal. The first wave to reach the amplifier may be of 100,000 to 10,000,000 times the amplitude of important later waves. A gain control system which operates to hold relatively constant seismic signals over such a range should have approximately an 80 db amplitude control range. That range cannot readily be obtained today in one tube of conventional amplifiers due to the limited range of linearity of vacuum tube characteristics.

It is accordingly an object of my invention to provide a gain controlled amplifier having a wide range of control.

It is a further object of my invention to provide a gain control which will reduce high amplitude signals to within the dynamic range of a recorder without substantial distortion.

It is a further object of my invention to provide a gain control circuit in which the gain is proportional to the antilogarithm of a control signal.

It is another object of my invention to provide an amplifier having a low noise level.

It is a further object of my invention to provide an amplifier having an 80 db range of gain control through a single tube.

It is a further object of my invention to provide a gain controlled amplifier which employs a single high voltage supply.

It is yet another object of my invention to provide a gain controlled amplifier in which the gain control signal does not appear in the output signal.

It is a more specific object of my invention to provide a gain control in which a first stage of amplification includes electron valves operated in the range in which their anode current has a logarithmic relationship to the grid cathode voltage.

In an amplifier according to my invention a cascode-type circuit is used in which the gain control voltage is applied in the cathode circuit of the first amplifier tube. By applying the control voltage to the cathode of the tube, I obviate the use of an auxiliary voltage source. The B+ voltage source is regulated, and my gain control is consistent enough that it may be calibrated accurately. A push-pull input circuit is employed to prevent the transmission of the gain control signal to the output circuit of the amplifier. The amplifier tubes are operated in the microampere range where their anode current is proportional to the antilogarithm of the control voltage, providing the anode voltage is constant. I have found that in this range the logarithmic relationship exists over an interval sufficiently large to permit gain control over an 80 db range. My circuit employs triodes which introduce a minimum of noise into the signal.

The novel features of my invention are set forth with more particularity in the accompanying claims. The invention itself, however, with respect to the details thereof, together with its additional objects and advantages, may be better understood from the following description of a specific embodiment with reference to the accompanying drawings, in which:

Figure 1:
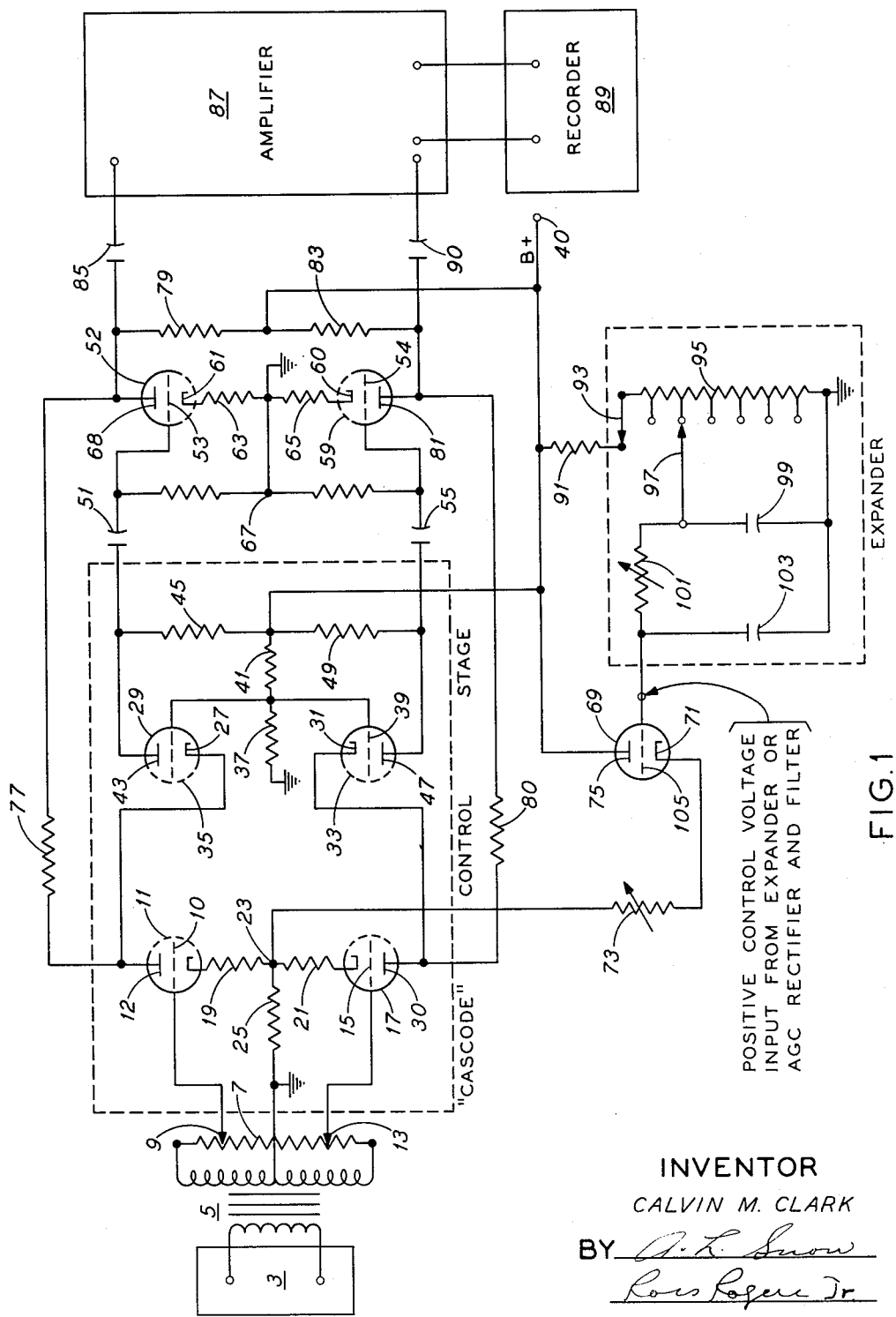
Figure 1 is a schematic diagram of a circuit according to my invention.

Referring to Figure 1, a geophone 3 is connected through a transformer 5 having a low step-up ratio to a ganged attenuator 7. A mid-point in the attenuator is connected to ground. A probe 9 on the attenuator 7 is connected to the grid of a first vacuum tube 11. A probe 13 on the attenuator 7 is connected to the grid 15 of a second vacuum tube 17. For signals of low input level such as electrical signals derived from conventional seismic detectors the tubes 11 and 17 are preferably identical high-mu triodes, such as 12 AX 7's, and are operated in the low anode current or microampere range.

Over a large portion of this region for fixed values of plate voltage the plate current bears a logarithmic relationship to the grid cathode voltage, and the transconductance is proportional to the plate current as will be discussed more fully later. The cathodes of tubes 11 and 17 are connected through resistors 19 and 21 to a common terminal 23. A resistor 25 is connected between the common terminal 23 and ground. The anode of the first tube 11 is connected to the cathode 27 of a third triode 29. The anode 30 of the second tube 17 is connected to the cathode 31 of a fourth tube 33. The third and fourth triodes 29 and 33 are identical high-mu triodes. The grid 35 of the third tube 29 and the grid 39 of the fourth tube are connected through the resistor 37 to ground. The positive terminal 40 of a source of voltage, regulated to have a constant value, is connected through the resistor 41 to the grids 35 and 39 of the third and fourth tubes. The anode 43 of the third tube 29 is connected through a resistor 45 to the positive terminal 40 of the source of voltage. The anode 47 of tube 33 is connected through a resistor 49 to the positive terminal 40 of the source of voltage. The anode 43 of the third tube is connected through a capacitor 51 to the grid 53 of a fifth tube 52. The anode 47 of the fourth tube is connected through a capacitor 55 to the grid 54 of a sixth tube 59. The cathodes 61 and 60 of the fifth and sixth tubes 52 and 59 are connected through resistors 63 and 65 to ground. The grids 53 and 54 of the fifth and sixth tubes 52 and 59 are connected across a voltage divider 67 which has a mid-point connected to ground.

The anode 68 of the tube 52 is connected through a resistor 77 to the anode 12 of the first tube 11 and through the resistor 79 to the positive terminal 40 of the voltage source. The anode 81 of the sixth tube 59 is connected through the resistor 80 to the anode 30 of the second tube 17 and through the resistor 83 to the positive terminal 40 of the voltage source. The anode 68 of the fifth tube 52 is coupled through the capacitor 85 to one terminal of an amplifier 87. The anode 81 of the sixth tube 59 is coupled through the capacitor 90 to a second terminal of the amplifier 87. The output of the amplifier 87 is connected to the input of a recorder 89.

The control circuit for the cascode amplifier contains a tube 69 having a cathode 71 connected through a variable resistor 73 and the resistor 25 to ground. The anode 75 of the tube 69 is connected to the positive terminal 40 of the source of voltage. The positive terminal 40 of the voltage source is connected through a resistor 91 to one terminal of a switch 93 and a rheostat 95 to ground. A probe 97 on the rheostat is connected through a capacitor 99 to ground and through a variable resistor 101 and capacitor 103 to ground. The grid 105 of the tube 69 is connected to a terminal between the resistor 101 and the capacitor 103.

In operation, the control system determines the gain of the amplifier. The switch 93 is initially closed, and the grid 105 of the tube 69 is biased to maintain the tube 69 conductive. Initially, the valve 69 is conductive and passes current through the resistor 25 to ground. The voltage across the resistor 25 impresses a negative bias between the grid 10 and the cathode of the first tube 11 and between the grid 15 and the cathode of the second tube 17, sufficient to decrease the gain of these tubes.

The effect of the varying grid bias on the tubes 11 and 17 is unusual. As pointed out in Wave Forms, volume 19, M. I. T. Radiation Laboratory Series, McGraw-Hill, 1949, pages 74 ff., certain triodes have a gain which is the antilogarithm of their grid voltage when the plate voltage is maintained constant and the tube is operated in the low current range. The tubes 11 and 17 are operated in the low current range and their gain is the antilogarithm of the control voltage impressed on resistor 25.

Figure 2:
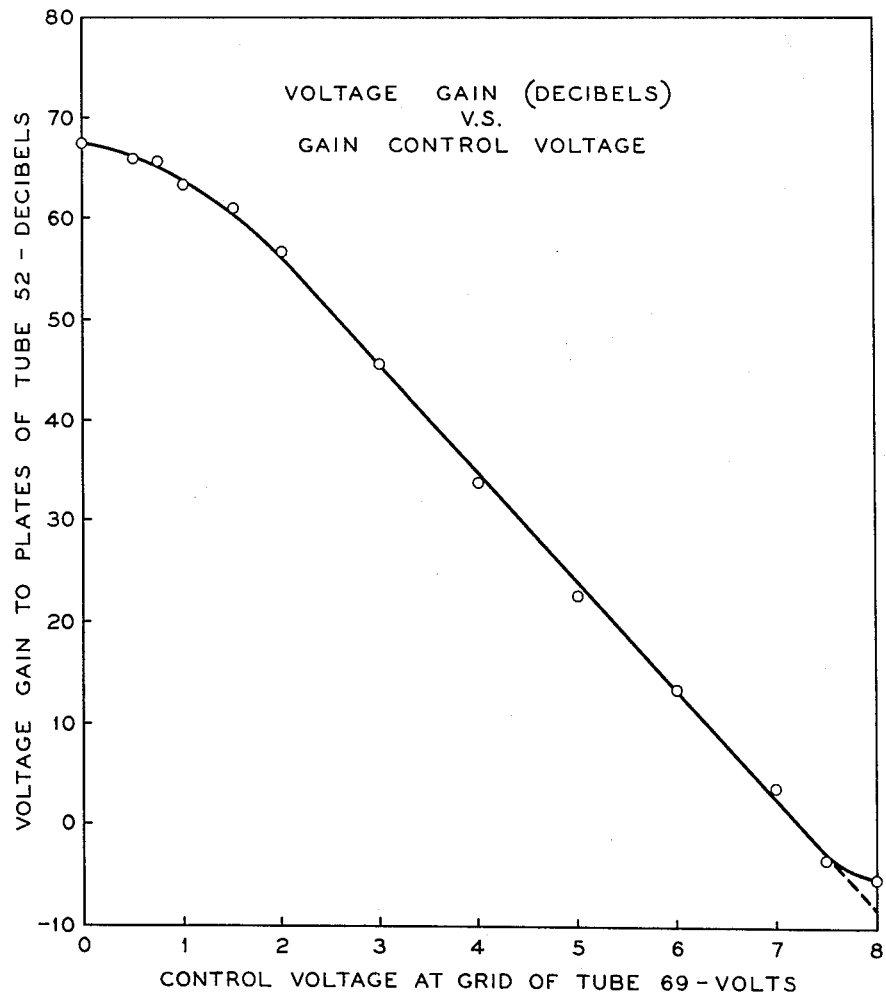
Figure 2 is a graph showing gain as a function of control voltage.

Figure 2 shows a graph having the grid voltage of tube 69 as the abscissa and the gain to the plates of tubes 52 and 59 as the ordinate. The units of the ordinate are decibels which are proportional to the logarithm of the voltage impressed on the output circuit 87. The tube 69 is operated in its linear range and a linear scale is used for the abscissa. It will be observed that over most of its length, the curve shown in Figure 2 is a straight line. The logarithmic relationship represented by this line is not uniform for all available electron tubes of suitable type of which I am aware. It is desirable, for the purpose of this invention, to select by test particular tubes wherein similar appropriate logarithmic relationships are produced, and to match such selected tubes in pairs having closely similar characteristics. While some tubes in a manufacturer's shipment of tubes have been found that followed the solid curve shown in Figure 2, I have found other tubes of the same shipment which were linear in regions of lower gain represented by the dotted line. Selected tubes must be carefully matched to assure that tubes 11 and 17 and 29 and 33 are nearly identical in order to provide well-balanced operation. Tests have indicated that proper selection of the electron tubes may be made so that the gain control has an essentially similar effect over a five decade range. These uniformity characteristics over a wide range permit the gain control circuit in an expander to be accurately calibrated by marking uniformly spaced intervals of the rheostat 95. Calibrations representing equal steps on the rheostat 95 can be made in terms of decibels since the decibel gain of the amplifier is essentially a linear function of the voltage impressed on the grid 105 of the tube 69.

Since the tubes 11 and 17 are being operated in the microampere anode current range, the transconductance and hence the gain of these tubes is an antilogarithmic function of the voltage impressed on the resistor 25. For this condition to exist, the anode-to-cathode voltage of the tubes 11 and 17 must be substantially constant. The cascode arrangement of the third and fourth tubes 29 and 33 maintains this constant relationship. The resistors 37 and 41 constitute a voltage divider between the positive terminal 40 of the voltage source and ground. The grids 35 and 39 of the third and fourth tubes 29 and 33 are connected to a mid-point on this voltage divider 37 and 41 and are at a substantially constant voltage.

Since the grids 35 and 39 are maintained at a constant voltage, the voltage existing between the cathodes 27 and 31 and ground is limited, and the tubes 29 and 33 tend to maintain constant the voltage impressed across the tubes 11 and 17. The signal and control currents which flow through the first and third tubes 11 and 29 flow through the plate load resistor 45. The signal and control currents through the second and fourth tubes 17 and 33 flow through the plate load resistor 49. The signal impressed upon the resistors 45 and 49 is coupled through the capacitors 51 and 55 to the grids 53 and 54 of the fifth and sixth tubes 52 and 59.

The above explanation indicates the relationship of amplification of the cascode amplifier to the voltage impressed on the resistor 25.

Initially, maximum current flows from the tube 69 through the resistor 25, reducing the gain of the amplifier to a minimum. In the expander, the capacitors 99 and 103 are fully charged. When it is desired to increase the amplification, the switch 93 is opened. The capacitors 99 and 103 begin to discharge when the switch 93 is opened, decreasing the positive voltage on the grid 105 of the tube 69. Current flow through the tube 69 decreases, decreasing the voltage impressed on the resistor 25, and the gain of the amplifier increases. The full charge on the capacitors 99 and 103 is controlled by the position of the probe 97 on the rheostat 95. The position of the probe 97 on the rheostat 95 then determines the initial gain of the amplifier. The magnitude of the capacitors 99 and 103 and of the resistor 101 determines the time constant of the control circuit and thereby determines the rate of increase of the gain of the amplifier after the switch is opened.

The switch 93 may be manually operated to initiate the increasing of the gain of the amplifier or it may be a Thyratron switch operated in response to an external signal. For example, if the explosion which initiates the earth tremor which is picked up by the geophone is electrically initiated, the switch 93 may be effectively connected in circuit with the switch which initiates the explosion. If it is desired to decrease the gain of the amplifier in response to the first signal received by the geophones to relatively decrease the amplitude of the initial signal, the switch 93 may be a Thyratron controlled by a signal which is controlled by a rectified signal from the geophone.

A circuit which may be used to operate this amplifier to provide automatic gain control is described in Patent No. 2,158,198, "Method and Apparatus for Making Geological Explorations," issued to H. R. Prescott. The Prescott patent shows an automatic gain control which may be used with my amplifier and control circuit to provide automatic gain control. If this alternative is used, the signal from the geophone is amplified, rectified and applied to bias the grid 105 of the tube 69. Thereby, the amplifier according to my invention will be controlled in response to the signal from the geophone. In that event, the time constant circuit involving the capacitors 99 and 103 and the resistors 101 and 95 would not be employed. In their place, the rectified and filtered signals from the geophones would be used.

The choice of tube types for the tube 69 depends on the value of the resistor 25 and the range of positive control voltage from the time constant circuit. A medium mu triode, such as a 12 AT 7, is satisfactory when used with the circuit shown in which the resistor 25 is 2,000 ohms; the resistor 101 is 2,000,000 ohms; the capacitor 103 is 1.0 microfarad; the capacitor 99 is 0.1 microfarad; and the voltage impressed across resistor 91 and rheostat 95 is 275 volts.

I have found that the amplifier operates satisfactorily from a 275-volt source when the voltage impressed upon the grids of the third and fourth tubes 29 and 33 is 180 volts, and the resistors 45 and 49 are 500,000 ohms. The anode voltage of the first and second tubes 10 and 17 is then held between 181 and 183 volts.

A substantial advantage in my circuit arises from the fact that the output of my amplifier is an antilogarithmic function of the input to the grids 10 and 15. The distortion introduced by the amplifier, then, tends to amplify or distort upward the peaks of the input voltage waves. By its nature, the transformer 5 tends to flatten out voltage peaks. The amplifier then compensates for the distortion of the transformer 5 and permits a faithful recording in the recorder 8 of the signal wave emitted by the geophone 3. If more compensation by the amplifier is required, the feedback resistors 77 and 81 may be selected to be voltage dependent. For example, Thyrite resistors or other impedances characterized by an impedance which decreases as the voltage impressed on the resistors increases may be employed.

I have shown an embodiment in which the amplifier is of the push-pull type. A single-ended cascode stage would give generally satisfactory and similar results, but the above-described distortion which compensates for the characteristics of the transformer 5 would be unbalanced and would appear only in the positive half-cycles through the tube 11.

Further, it is possible to employ sharp cut-off pentodes instead of the high-mu triodes 11 and 17. It is not essential that the tubes 11 and 15 be operated in the microampere range if tubes are selected in which the output is an exponential function of the grid voltage over a different range. I have found, however, that tubes which are currently commercially available have the logarithmic function characteristic at these values of plate current.

Although I have shown and described a preferred embodiment of my invention, I realize that many modifications thereof are possible without departing from the spirit and scope of the inventive concept. I do not intend, therefore, that my invention be limited to the specific embodiment disclosed herein, but that it include all equivalents within the definitions of the appended claims.

I claim:

1. For use in controlling the gain of an amplifier, the combination comprising an input vacuum tube, means for constraining the vacuum tube to operate in the microampere region, a pair of principal electrodes in the vacuum tube, a second vacuum tube in series with said input vacuum tube and a load, said second vacuum tube being adapted to impress a substantially constant voltage between the principal electrodes of the input vacuum tube, and means for impressing a variable bias on the input vacuum tube.

2. An amplifier comprising, in combination, a first vacuum tube having anode, cathode and control electrode, means for impressing between the anode and cathode a substantially constant voltage, said last-named means including a vacuum tube and a load, means for impressing a signal voltage between the control electrode and a predetermined point, a first resistor connected between the cathode and the predetermined point, a second vacuum tube having an anode, cathode and control electrode, means for connecting the cathode of the second vacuum tube through the first resistor to the predetermined point, means for impressing a predetermined voltage between the anode of the second vacuum tube and the predetermined point, means for impressing the predetermined voltage on a switch and a second resistor connected in series, a capacitor connected in parallel with the second resistor, and means for connecting the capacitor between the control electrode of the second vacuum tube and the predetermined point.

3. An amplifier comprising, in combination, a pair of electron tubes connected in push-pull relationship, anodes, cathodes and control electrodes in said vacuum tubes, means for impressing a signal voltage from a source between the control electrodes of the vacuum tubes and a point of reference potential, means for impressing a substantially constant voltage between the anodes and cathodes of the vacuum tube, means for causing said electron tubes to operate in the microampere range, and circuit means comprising an electron valve connected to provide current which varies in response to a time varying voltage on said electron valve, for impressing a control voltage between the cathodes of the vacuum tubes and ground.

4. An amplifier comprising a first vacuum tube, means for maintaining substantially constant the voltage across said tube, said last-named means including a second vacuum tube and load in series with the first vacuum tube, whereby the voltage impressed across the second vacuum tube varies inversely with the voltage impressed across the load, means for biasing said first tube and means for operating said first tube in a range such that the gain of said first tube is an exponential function of the voltage of said biasing means.

5. In an amplifier a push pull connected cascode stage comprising a first pair of vacuum tubes each having an anode, a cathode, and a control electrode, a second pair of vacuum tubes each having an anode, a cathode, and a control electrode, means connecting the anodes of each of said first pair of vacuum tubes to the cathode of a respective second vacuum tube, a load connected between the anode of each of said second vacuum tubes and a source of voltage, means for maintaining the control electrode of each of said second vacuum tubes at a constant potential, means for operating said first pair of vacuum tubes in the microampere region, means for impressing a signal voltage between a point of predetermined potential and the control electrodes of the first pair of vacuum tubes, and means for impressing a control voltage between the cathodes of the first pair of vacuum tubes and the point of predetermined potential.

References Cited in the file of this patent
UNITED STATES PATENTS

| | | |
|---|---|---|
| 2,273,997 | Rubin | Feb. 24, 1942 |
| 2,430,983 | Hoover | Nov. 18, 1947 |
| 2,462,452 | Yates | Feb. 22, 1949 |
| 2,507,432 | Bass | May 9, 1950 |
| 2,547,903 | Dubois | Apr. 3, 1951 |
| 2,551,150 | McGoffin | May 1, 1951 |
| 2,638,512 | Bessey | May 12, 1953 |

OTHER REFERENCES

Book: "Wave Forms," Radiation Lab. Series, vol. 19, McGraw-Hill, 1949, pages 74–77.

Article: "Direct Coupled Amplifiers" by Volkers, pub. in Electronics, March 1951, pp. 126–129, McGraw-Hill.